United States Patent
Dhana Sekaran et al.

(10) Patent No.: US 10,824,884 B2
(45) Date of Patent: Nov. 3, 2020

(54) DEVICE FOR PROVIDING IMPROVED OBSTACLE IDENTIFICATION

(71) Applicant: Conti Temic microelectronic GmbH, Nuremberg (DE)

(72) Inventors: Sudhan Dhana Sekaran, Bamberg (DE); Joerg Schrepfer, Tettau (DE); Johannes Petzold, Kulmbach (DE); Markus Friebe, Gefrees (DE); Georg Arbeiter, Kueps (DE); Peerayut Khongsab, Grebrunn (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/468,093

(22) PCT Filed: Dec. 6, 2017

(86) PCT No.: PCT/DE2017/200129
§ 371 (c)(1),
(2) Date: Jun. 10, 2019

(87) PCT Pub. No.: WO2018/108215
PCT Pub. Date: Jun. 21, 2018

(65) Prior Publication Data
US 2020/0074191 A1 Mar. 5, 2020

(30) Foreign Application Priority Data
Dec. 15, 2016 (DE) .................. 10 2016 225 073

(51) Int. Cl.
*G06K 9/00* (2006.01)
*B60R 1/00* (2006.01)

(52) U.S. Cl.
CPC ............ *G06K 9/00805* (2013.01); *B60R 1/00* (2013.01); *B60R 2300/105* (2013.01); *B60R 2300/301* (2013.01); *G06T 2207/30261* (2013.01)

(58) Field of Classification Search
CPC ............................ G06K 9/00805; B60R 1/00; B60R 2300/105; B60R 2300/301; G06T 2207/30261
(Continued)

(56) References Cited

U.S. PATENT DOCUMENTS 8,154,594 B2 * 4/2012 Seki .................... B60R 1/00
348/119
8,331,653 B2 * 12/2012 Seki .................... G06T 7/74
382/103

(Continued)

FOREIGN PATENT DOCUMENTS

DE   102006003538   7/2007
DE   102012215026   5/2014
(Continued)

OTHER PUBLICATIONS

English translation of the International Search Report of the International Searching Authority for International Application PCT/DE2017/200129, dated Apr. 3, 2018, 2 pages, European Patent Office, HV Rijswijk, Netherlands.
(Continued)

*Primary Examiner* — Eric Blount
(74) *Attorney, Agent, or Firm* — W. F. Fasse

(57) ABSTRACT

A device provides improved obstacle identification. A first camera acquires first vehicle image data and provides it to a processing unit. A second camera acquires and provides second vehicle image data. An image overlap region has at least a portion of the first vehicle image data and at least a portion of the second vehicle image data. The first and
(Continued)

second vehicle image data extend over a ground plane and the image overlap region extends over an overlap region of the ground plane. The processing unit extracts first image features from the first vehicle image data and extracts second image features from the second vehicle image data. The processing unit projects the first and the second image features onto the ground plane. The processing unit produces at least one image of the surroundings, having either at least a portion of the first vehicle image data associated with the overlap region, or at least a portion of the second vehicle image data associated with the overlap region, based in part on the determination of first image features whose projections lie in the overlap region of the ground plane, and on second image features whose projections lie in the overlap region of the ground plane.

14 Claims, 5 Drawing Sheets

(58) Field of Classification Search
USPC .......................................................... 340/937
See application file for complete search history.

(56) References Cited

U.S. PATENT DOCUMENTS

| | | | |
|---|---|---|---|
| 10,127,463 B2* | 11/2018 | Fursich | ................ H04N 13/239 |
| 2008/0043113 A1 | 2/2008 | Ishii | |
| 2009/0022423 A1 | 1/2009 | Ehlgen et al. | |
| 2010/0020170 A1 | 1/2010 | Higgins-Luthman et al. | |
| 2014/0247352 A1* | 9/2014 | Rathi | ................... G06T 3/4038 |
| | | | 348/148 |
| 2015/0175073 A1 | 6/2015 | Graef | |
| 2017/0006234 A1* | 1/2017 | Higuchi | ................. H04N 5/247 |

FOREIGN PATENT DOCUMENTS

| | | |
|---|---|---|
| DE | 102015204213 | 9/2016 |
| EP | 2 437 494 | 4/2012 |
| WO | WO 2015/146230 | 10/2015 |

OTHER PUBLICATIONS

PCT International Preliminary Report on Patentability including English Translation of PCT Written Opinion of the International Searching Authority for International Application PCT/DE2017/200129, dated Jun. 18, 2019, 9 ppages, International Bureau of WIPO, Geneva, Switzerland.

German Search Report for German Patent Application No. 10 2016 225 073.6, dated Nov. 7, 2017, 10 pages, German Patent and Trademark Office, Muenchen, Germany, with partial English translation, 8 pages.

* cited by examiner

DEVICE FOR PROVIDING IMPROVED OBSTACLE IDENTIFICATION

FIELD OF THE INVENTION

The present invention relates to a device for providing improved obstacle identification, to a system for providing improved obstacle identification, to a method for providing improved obstacle identification, and to a computer program element.

BACKGROUND OF THE INVENTION

The general background of this invention is the field of driver assistance systems. A driver assistance system is used in a vehicle to assist a driver in carrying out driving maneuvers, in particular parking maneuvers. A conventional driver assistance system may have a surroundings imaging system, which has cameras which are adapted to acquire camera images of the vehicle's surroundings, in order to produce an image of the surroundings. The produced image of the surroundings may be displayed to the driver on a display during a driving maneuver. With a surroundings imaging system, a plan view may be produced from a plurality of camera images. The surroundings imaging system may comprise a plurality of cameras, wherein adjacent cameras may have an overlapping field of view, FOV. Conventional surroundings imaging systems lead to poor identification of obstacles in overlap regions and in regions which extend into the overlap regions. If obstacles are located in an overlap region and/or extend into an overlap region, they are only poorly visible to a surroundings imaging system. This may lead to inadequate safety functions of the driver assistance system using the plan view produced by the surroundings imaging system.

SUMMARY OF THE INVENTION

It would be advantageous to provide an improved device for obstacle identification.

The object of the present invention can be achieved with the subject matter of a device and a method, respectively according to the invention, as set forth herein. It should be noted that the following described aspects and examples of the invention also apply to the device for providing improved obstacle identification, the system for providing improved obstacle identification, the method for providing improved obstacle identification and to the computer program element.

According to a first aspect, a device is provided for providing improved obstacle identification, having:
 a first camera;
 a second camera; and
 a processing unit.

The first camera is configured to acquire first vehicle image data, and the first camera is configured to deliver the first vehicle image data to the processing unit. The second camera is configured to acquire second vehicle image data, and the second camera is configured to deliver the second vehicle image data to the processing unit. An image overlap region exists, having at least a portion of the first vehicle image data and at least a portion of the second vehicle image data. The first vehicle image data and the second vehicle image data extend over a ground plane, wherein the image overlap region extends over an overlap region of the ground plane. The processing unit is configured to extract first image features from the first vehicle image data, and is configured to extract second image features from the second vehicle image data. The processing unit is also configured to project the first image features onto the ground plane, and is configured to project the second image features onto the ground plane. The processing unit is configured to produce at least one image of the surroundings, having either (a) at least a portion of the first vehicle image data associated with the overlap region, or (b) at least a portion of the second vehicle image data associated with the overlap region. The production is based in part on the determination of first image features whose projections lie in the overlap region of the ground plane, and second image features whose projections lie in the overlap region of the ground plane.

In other words, an overlap region of an image of the surroundings may use images from one of two cameras, which each see this overlap region, taking account of the projections, lying in the overlap region, of an object seen by each camera. This makes it possible for those camera images to be selected for the overlap region which may be better assembled with the individual camera images from each camera in order to deliver representative images of obstacles.

In other words, images which have more projected features in an image overlap region may be prioritized.

In this way, objects and obstacles around an automobile are rendered more visible, specifically in a vehicle imaging system with an image of the surroundings or a plan view.

Thus, features may be taken into account which lie within the overlap region and whose projections lie in the overlap region, and objects which are located outside the overlap region but whose projections lie in the overlap region may likewise be taken into account.

In one example, the processing unit is configured to determine a number of first image features whose projections lie in the overlap region of the ground plane, and is configured to determine a number of second image features whose projections lie in the overlap region of the ground plane. The processing unit is configured to produce the at least one image of the surroundings which has at least a portion of the first vehicle image data associated with the overlap region if the number of first image features whose projections lie in the overlap region is greater than the number of second image features whose projections lie in the overlap region. The processing unit is also configured to produce the at least one image of the surroundings which has at least a portion of the second vehicle image data associated with the overlap region if the number of second image features whose projections lie in the overlap region is greater than the number of first image features whose projections lie in the overlap region.

In other words, the image for the overlap region is determined depending on which image has more identifiable image features whose projections of the image features lie in the overlap region.

In one example, extraction of the first image features comprises determination of binary data, and extraction of the second image features comprises determination of binary data.

In other words, the feature extraction method results in a binary image, which may for example have ones where features have been detected and zeros where no features have been detected. This simplifies determination of the number of features whose projections lie in the overlap region, this merely requiring a summation operation.

In one example, the first image features are projected along vectors which extend from the first camera through the first image features to the ground plane, and the second image features are projected along vectors which extend from the second camera through the second image features to the ground plane.

In one example, the at least one image of the surroundings comprises the first vehicle image data outside the overlap region and comprises the second vehicle image data outside the overlap region.

Thus, the image of the surroundings uses the suitable image for the overlap region and the non-overlapping images to provide an image of the surroundings for improved obstacle identification around a vehicle.

In one example, the production of the at least one image of the surroundings is based in part on first image features located in the overlap region and on second image features located in the overlap region.

In other words, the image data suitable for use for the overlap region are based not only on features whose projections lie in the overlap region but also on features whose world coordinates lie within the overlap region. A feature may thus be taken into account which lies outside the overlap region but whose projections lie in the overlap region, as may a feature which lies in the overlap region but whose projections onto the ground plane lie outside the overlap region. In this way, tall objects on the side remote from the overlap region may be suitably taken into account when selecting the images for displaying the overlap region.

In one example, the processing unit is configured to determine a number of first image features in the overlap region and is configured to determine a number of second image features in the overlap region. The processing unit is also configured to produce the at least one image of the surroundings comprising at least a portion of the first vehicle image data associated with the overlap region if the number of first image features whose projections lie in the overlap region, added to the number of first image features in the overlap region, is greater than the number of second image features whose projections lie in the overlap region, added to the number of second image features in the overlap region. The processing unit is also configured to produce the at least one image of the surroundings comprising at least a portion of the second vehicle image data associated with the overlap region if the number of second image features whose projections lie in the overlap region, added to the number of second image features in the overlap region, is greater than the number of first image features whose projections lie in the overlap region, added to the number of first image features in the overlap region.

According to a second aspect, a vehicle is provided which is configured to bring about improved obstacle identification, having:
 a device for providing improved obstacle identification according to the first aspect; and
 a display unit.

The display unit is configured to display at least one image of the surroundings.

According to a third aspect, a method is provided for providing improved obstacle identification, having:
a) acquisition of first vehicle image data with a first camera;
b) provision of the first vehicle image data to a processing unit by the first camera;
c) acquisition of second vehicle image data with a second camera, wherein a region of image overlap exists which has at least a portion of the first vehicle image data and at least a portion of the second vehicle image data, and wherein the first vehicle image data and the second vehicle image data extend over a ground plane and wherein the image overlap region extends over an overlap region of the ground plane;
d) provision of the second vehicle image data to the processing unit by the second camera;
e) extraction of the first image features from the first vehicle image data by the processing unit;
f) extraction of the second image features from the second vehicle image data by the processing unit;
g) projection of the first image features onto the ground plane by the processing unit;
h) projection of the second image features onto the ground plane by the processing unit; and
i) production of at least one image of the surroundings by the processing unit, having either (i-a) at least a portion of the first vehicle image data associated with the overlap region, or (i-b) at least a portion of the second vehicle image data associated with the overlap region, wherein the production is based in part on a determination of first image features whose projections lie in the overlap region of the ground plane and second image features whose projections lie in the overlap region of the ground plane.

In one example, step g) comprises determination, by the processing unit, of a number of first image features whose projections lie in the overlap region of the ground plane; and step h) comprises determination, by the processing unit, of a number of second image features whose projections lie in the overlap region of the ground plane; and step i-a) proceeds if the number of first image features whose projections lie in the overlap region is greater than the number of second image features whose projections lie in the overlap region; and step i-b) proceeds if the number of second image features whose projections lie in the overlap region is greater than the number of first image features whose projections lie in the overlap region.

According to another aspect, a computer program element control device is provided, as described above, in which the computer program element is executed by a processing unit and which is suitable to execute the above-described method steps.

A computer-readable medium is also provided which has stored the above-described computer program element.

The advantages provided by one of the above aspects advantageously apply equally to all other aspects and vice versa.

The above aspects and examples are explained with reference to the following exemplary embodiments.

BRIEF DESCRIPTION OF THE FIGURES

Embodiments are described below with reference to the following drawings.

DETAILED DESCRIPTION OF EMBODIMENTS

Figure 1:
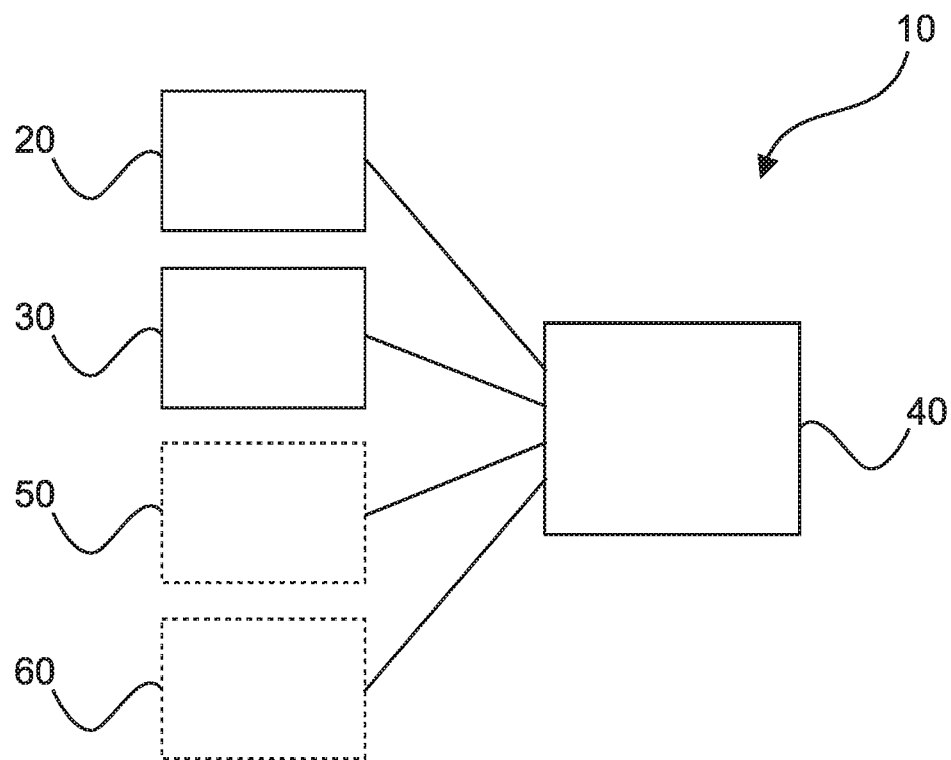
FIG. 1 shows a schematic configuration of an example of a device for providing improved obstacle identification.

FIG. 1 shows an example of a device 10 for providing improved obstacle identification. The device comprises a first camera 20, a second camera 30 and a processing unit 40. The first camera 20 is configured to acquire first vehicle image data, and the first camera 20 is configured to deliver the first vehicle image data to the processing unit. The second camera 30 is configured to acquire second vehicle image data, and the second camera 30 is configured to deliver the second vehicle image data to the processing unit 40. This provision of image data may proceed by wired or wireless communication. An image overlap region exists, which has at least a portion of the first vehicle image data and at least a portion of the second vehicle image data. The first vehicle image data and the second vehicle image data extend over a ground plane and the image overlap region extends over an overlap region of the ground plane. The processing unit 40 is configured to extract first image features from the first vehicle image data, and is configured to extract second image features from the second vehicle image data. The processing unit 40 is also configured to project the first image features onto the ground plane, and is configured to project the second image features onto the ground plane. The processing unit 40 is configured to produce at least one image of the surroundings, having either (a) at least a portion of the first vehicle image data associated with the overlap region, or (b) at least a portion of the second vehicle image data associated with the overlap region. The production is based in part on the determination of first image features whose projections lie in the overlap region of the ground plane, and on second image features whose projections lie in the overlap region of the ground plane.

In one example, the processing unit is configured to produce at least one image of the surroundings in real time.

In one example, the first and second cameras are mounted on different sides of a vehicle chassis.

In one example, the device further comprises a third camera 50 and a fourth camera 60, which are configured to acquire third vehicle image data and fourth vehicle image data. A second image overlap region exists, which has at least a portion of the first vehicle image data and at least a portion of the third vehicle image data. A third image overlap region exists, which has at least a portion of the second vehicle image data and at least a portion of the fourth vehicle image data. A fourth image overlap region exists, which has at least a portion of the third vehicle image data and at least a portion of the fourth vehicle image data.

In one example, each of the cameras has a field of view which is greater than 180 degrees.

In one example, a radar sensor is used together with the first camera to determine the distance away of objects which are mapped in the field of view of the camera. In one example, a radar sensor is used together with the second camera to determine the distance away of objects which are mapped in the field of view of the camera. In the examples, LiDAR and/or ultrasonic sensors are used as an alternative or in addition to the radar sensors to determine the distances away of objects mapped in the fields of view of the cameras.

According to one example, the processing unit 40 is configured to determine a number of first image features whose projections lie in the overlap region of the ground plane, and is configured to determine a number of second image features whose projections lie in the overlap region of the ground plane. The processing unit 40 is also configured to produce at least the one image of the surroundings which has at least a portion of the first vehicle image data associated with the overlap region if the number of first image features whose projections lie in the overlap region is greater than the number of second image features whose projections lie in the overlap region. The processing unit 40 is also configured to produce at least the one image of the surroundings which has at least a portion of the second vehicle image data associated with the overlap region if the number of second image features whose projections lie in the overlap region is greater than the number of first image features whose projections lie in the overlap region.

In one example, an edge detection algorithm is used to acquire first and second image features.

According to one example, extraction for determining the first image features includes binary data, and extraction for determining the second image features includes binary data.

According to one example, the first image features are projected along vectors which extend from the first camera 20 through the first image features to the ground plane, and the second image features are projected along vectors which extend from the second camera 30 through the second image features to the ground plane.

According to one example, the at least one image of the surroundings comprises the first vehicle image data outside the overlap region and comprises the second vehicle image data outside the overlap region.

According to one example, the production of the at least one image of the surroundings is based in part on first image features located in the overlap region and on second image features located in the overlap region.

According to one example, the processing unit is configured to determine a number of first image features in the overlap region, and is configured to determine a number of second image features in the overlap region. The processing unit is also configured to produce at least the one image of the surroundings which has at least a portion of the first vehicle image data associated with the overlap region if the number of first image features whose projections lie in the overlap region, added to the number of first image features in the overlap region, is greater than the number of second image features whose projections lie in the overlap region, added to the number of second image features in the overlap region. The processing unit is configured to produce at least the one image of the surroundings which has at least a portion of the second vehicle image data associated with the overlap region if the number of second image features whose projections lie in the overlap region, added to the number of second image features in the overlap region, is greater than the number of first image features whose projections lie in the overlap region, added to the number of first image features in the overlap region.

Figure 2:
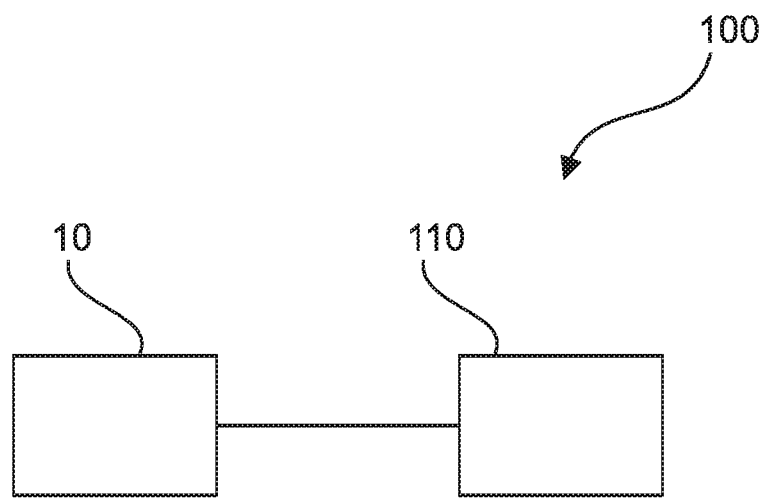
FIG. 2 shows a schematic configuration of an example of a system for providing improved obstacle identification.

FIG. 2 shows an example of a vehicle 100, which is configured to provide improved obstacle identification. The vehicle 100 has a device 10 for providing improved obstacle identification as described with reference to FIG. 1. The vehicle 100 also comprises a display unit 110. The display unit 110 is configured to display the at least one image of the surroundings.

Figure 3:
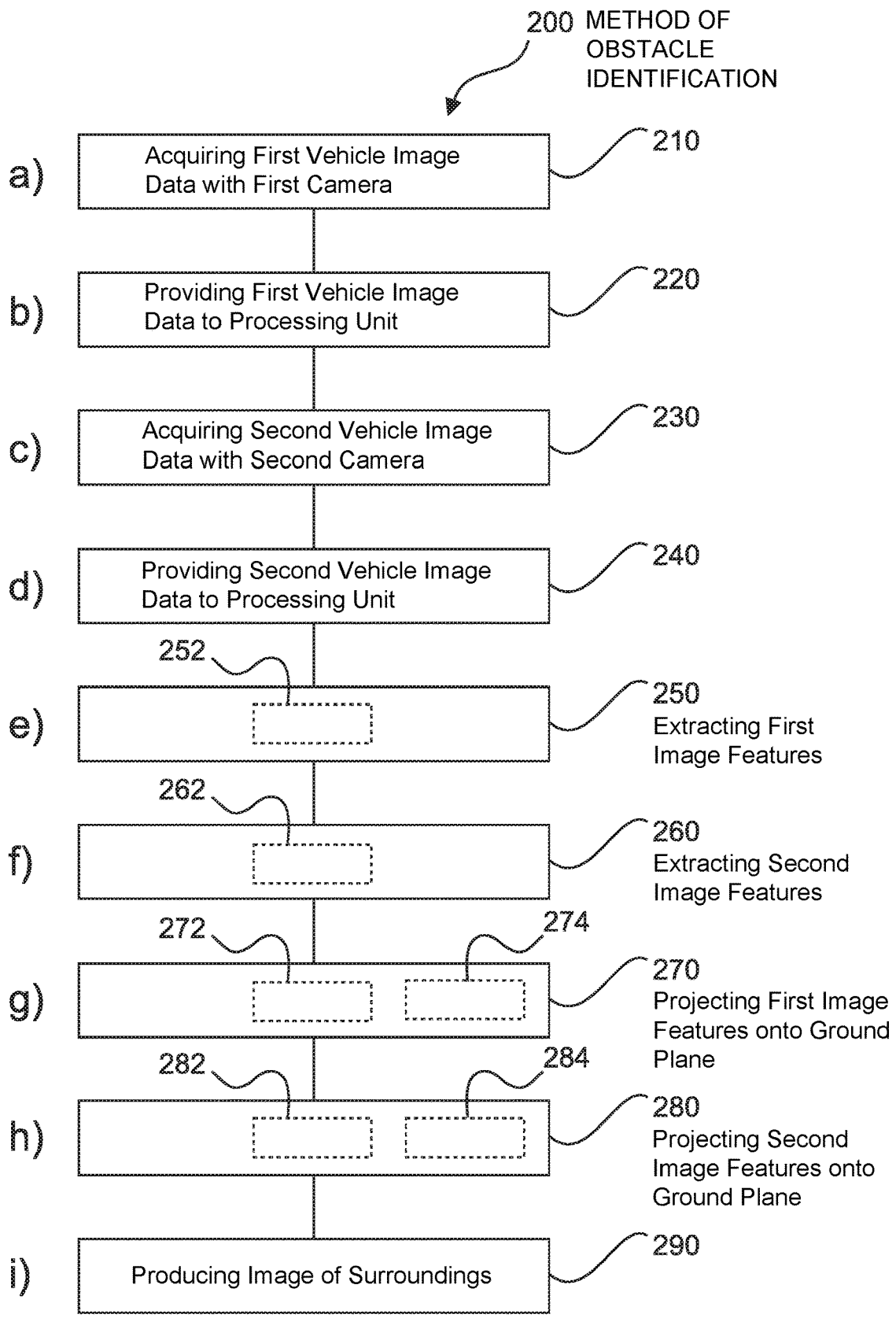
FIG. 3 shows a method for providing improved obstacle identification.

FIG. 3 shows the basic steps of a method 200 for providing improved obstacle identification. The method 200 includes:

in an acquisition step 210, also denoted step a), acquisition of first vehicle image data with a first camera 20;

in a provision step 220, also designated step b), provision of the first vehicle image data to a processing unit 40 by the first camera;

in an acquisition step 230, also designated step c), acquisition of second vehicle image data with a second camera 30, wherein a region of image overlap exists which has at least a portion of the first vehicle image data and at least a portion of the second vehicle image data, and wherein the first vehicle image data and the second vehicle image data extend over a ground plane and wherein the image overlap region extends over an overlap region of the ground plane;

in a provision step 240, also designated step d), provision of the second vehicle image data to the processing unit by the second camera;

in an extraction step 250, also designated step e), extraction of the first image features from the first vehicle image data by the processing unit;

in an extraction step 260, also designated step f), extraction of the second image features from the second vehicle image data by the processing unit;

in a projection step 270, also designated step g), projection of the first image features onto the ground plane by the processing unit;

in a projection step 280, also designated step h), projection of the second image features onto the ground plane by the processing unit; and in a production step 290, also designated step i), production of at least one image of the surroundings by the processing unit, having either (i-a) at least a portion of the first vehicle image data associated with the overlap region, or (i-b) at least a portion of the second vehicle image data associated with the overlap region, wherein the production is based in part on a determination of first image features whose projections lie in the overlap region of the ground plane and second image features whose projections lie in the overlap region of the ground plane.

According to one example, step g) comprises identification 272 by the processing unit of a number of first image features whose projections lie in the overlap region of the ground plane. In this example, step h) comprises identification 282 by the processing unit of a number of second image features whose projections lie in the overlap region of the ground plane. In this example, step i-a) applies if the number of first image features whose projections lie in the overlap region is greater than the number of second image features whose projections lie in the overlap region. In this example, step i-b) applies if the number of second image features whose projections lie in the overlap region is greater than the number of first image features whose projections lie in the overlap region.

In one example, step e) comprises determination 252 of binary data, and step f) comprises determination 262 of binary data.

In one example, step g) comprises projection 274 of first image features along vectors which extend from the first camera 20 through the first image features to the ground plane. In this example, step h) comprises projection 284 of second image features along vectors which extend from the second camera 30 through the second image features to the ground plane.

In one example, step i) comprises production of the at least one image of the surroundings in part on the basis of the first image features located in the overlap region and of the second image features located in the overlap region.

In one example, the method includes determination of a number of first image features in the overlap region and determination of a number of second image features in the overlap region. In this example, step i-a) proceeds if the number of first image features whose projections lie in the overlap region, added to the number of first image features in the overlap region, is greater than the number of second image features whose projections lie in the overlap region, added to the number of second image features in the overlap region. In this example, step i-b) proceeds if the number of second image features whose projections lie in the overlap region, added to the number of second image features in the overlap region, is greater than the number of first image features whose projections lie in the overlap region, added to the number of first image features in the overlap region.

Examples of the device, system and method for providing improved obstacle identification will now be described in conjunction with FIGS. 4-7.

In a surroundings imaging system the plan view is produced from a plurality of camera images. Due to the overlapping regions between each pair of cameras, the plan view may be assembled from one of the two cameras in these regions, which may lead to an obstacle being invisible. Thus, the current prior art in relation to camera-based driver assistance systems may lead to inadequate safety. The device, system and method described here for providing improved obstacle identification address said problem by prioritizing the images from one of the two cameras in respect of the overlap region from which the plan view is assembled.

Figure 4:
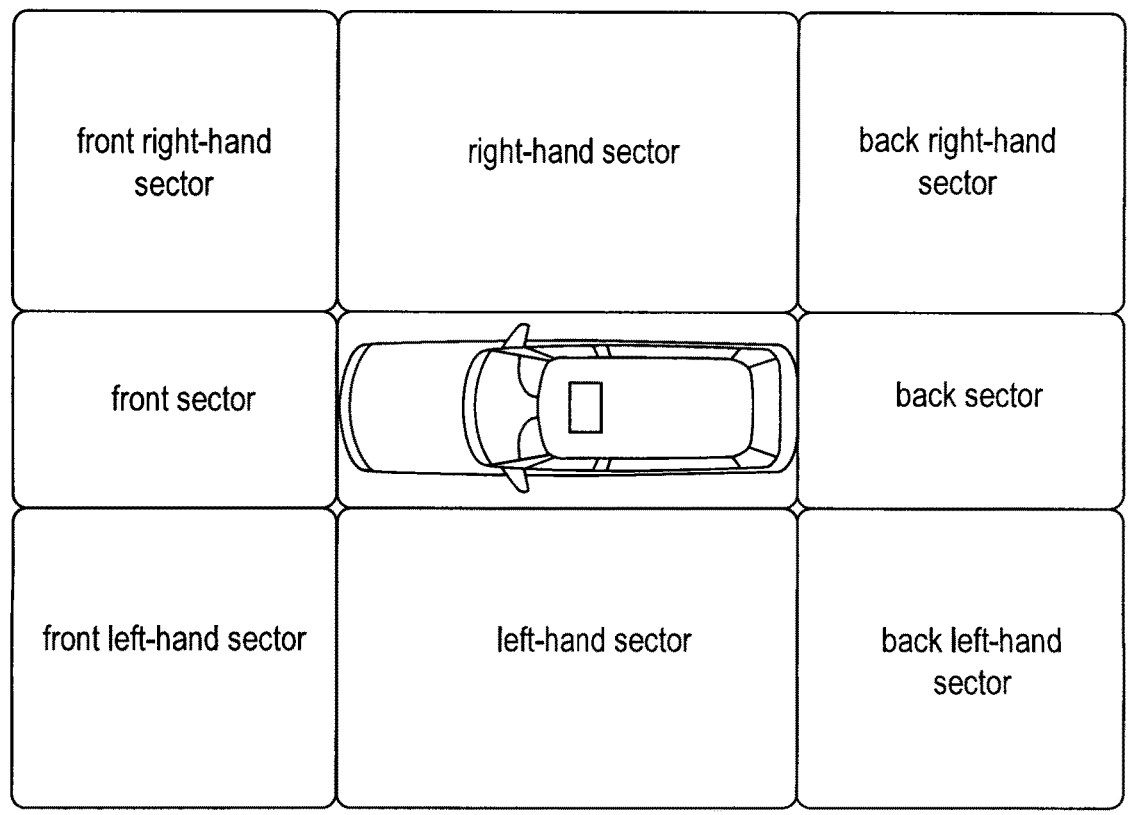
FIG. 4 shows the classification of regions around a vehicle into various sectors.
Figure 5:
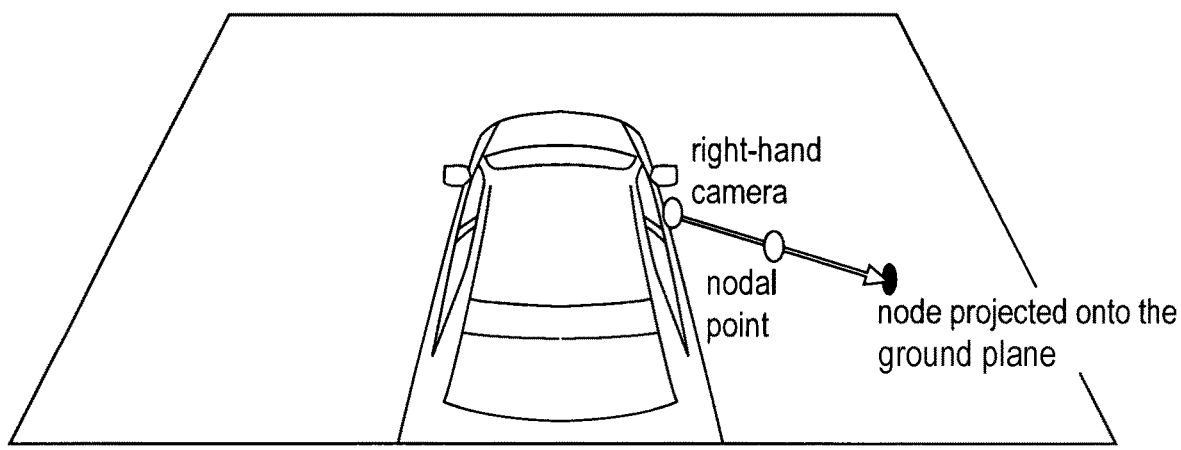
FIG. 5 shows a schematic configuration of an example of the projections of an image feature onto the ground plane.

A detailed procedure for operation, operation of the device and of the system for providing improved obstacle identification will now be described in conjunction with FIGS. 4-5.

i. The nodes in the fence data are represented in world coordinates. The various regions of the plan view are subdivided into sectors, as shown in FIG. 4.

ii. Each node or each feature, such as an identified edge, in the fence data is categorized into one of the sectors in respect of its position in world coordinates. In other words, image features such as edges are acquired or extracted and are classified into the regions in which they are located.

iii. The nodes in sectors front, back, right and left are projected in respect of the front, back, right-hand and left-hand camera position onto the ground plane, as shown in FIG. 5.

iv. The nodes in the overlapping sectors are projected twice with regard to two cameras of the overlapping regions onto the ground plane. For example, the node in the front right-hand overlap region is projected twice in relation to the right-hand and front cameras onto the ground plane. Thus, each node in the overlapping region results in two starting points in the fence operation.

v. All projected points are in turn categorized into one of the sectors in relation to the position thereof in world coordinates (i.e. step ii is repeated for the projected points). This is the output of the fence operation for adaptive overlap regions.

vi. Each overlapping sector thus has two sets of initial nodes. The camera which produces more initial nodes in the overlapping region receives a higher priority. For example, if the output of the fence operation has more projected nodes from the front camera in the front right-hand overlapping sector, the front camera image data in the overlapping region is given a higher priority.

Examples of detailed examples of systems for providing improved obstacle identification will now be described with reference to FIGS. 6-7.

Figure 6:
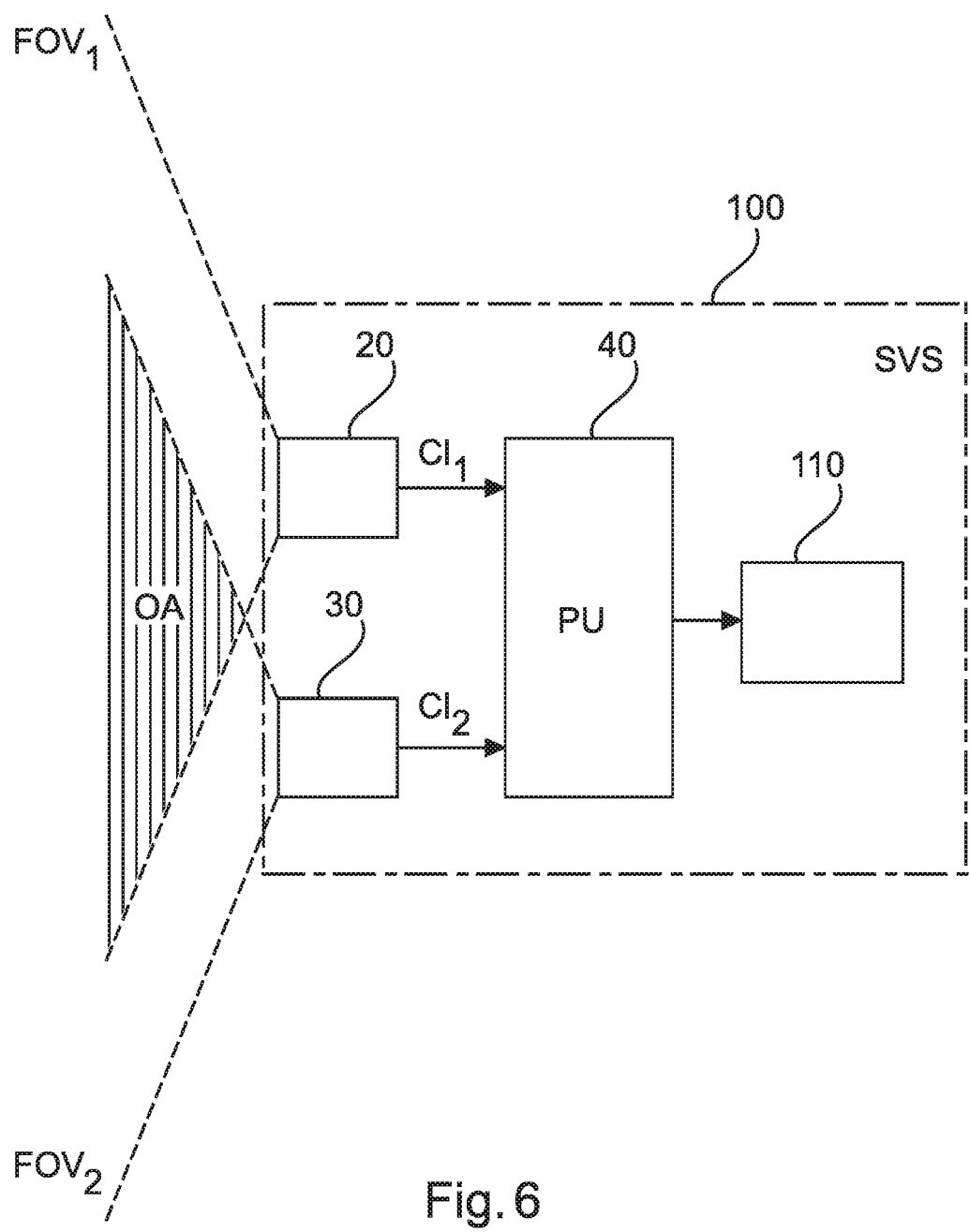
FIG. 6 shows a schematic configuration of an example of a system for providing improved obstacle identification.

FIG. 6 shows a detailed example of a surroundings imaging system 100, as described in relation to FIG. 2. The system 100 comprises at least one pair of cameras, formed of two cameras 20, 30 with overlapping fields of view FOV which are adapted to produce camera images CI with an overlap region OA, as shown in FIG. 6. In this example, the pair of cameras is directed forwards, but they could be oriented with their optical axes at right angles to one another, as shown in FIG. 7. The field of view FOV of each camera 20, 30 may amount to more than 180 degrees. The cameras 20, 30 may be provided with "fisheye" lenses mounted on a chassis of a vehicle.

The cameras 20, 30 are connected to a processing unit 40, which may have at least one microprocessor. The processing unit 40 is configured to calculate the images of the surroundings, including overlapping regions OAs, in respect of each camera. The processing unit extracts features from the images and projects these onto the ground plane, as shown in FIG. 5. Depending on whether the number of features projected onto the ground plane and located in an overlap region OA which are seen by the camera 20 is greater than the number of features projected onto the ground plane and located in the overlap region OA which are seen by the camera 30, priority is given, for assembly of the image of the surroundings, to the camera image CI captured by either camera 20 or 30 depending on which has the greater associated number of projected features in the OA. The images may be stored temporarily in a buffer memory of the processing unit 40. As part of the feature extraction process, the processing unit may produce a binary image in which features such as edges in an image are represented as ones and other parts of the image are represented as zeros.

In FIG. 6 the first camera 20 of the pair of cameras produces a first camera image CI1 and the second camera 30 of the pair of cameras a second camera image CI2. The processing unit 40 calculates images of a plan view for the overlap regions in respect of each camera. The processing unit 40 comprises an edge detector or feature detector which is suitable for calculating edges or features for all images which may optionally be provided as two binary images BI. The processing unit 40 comprises a projector, which projects detected or extracted features from the images from the position of the camera through the feature onto the ground plane, as shown in FIG. 5. The processing unit then adds together the number of features which have been projected by each camera onto the ground plane and uses this information to prioritize the images of the respective camera which are used to assemble the image for the overlap region. The number of cameras adapted to acquire the camera images CI may vary.

Figure 7:
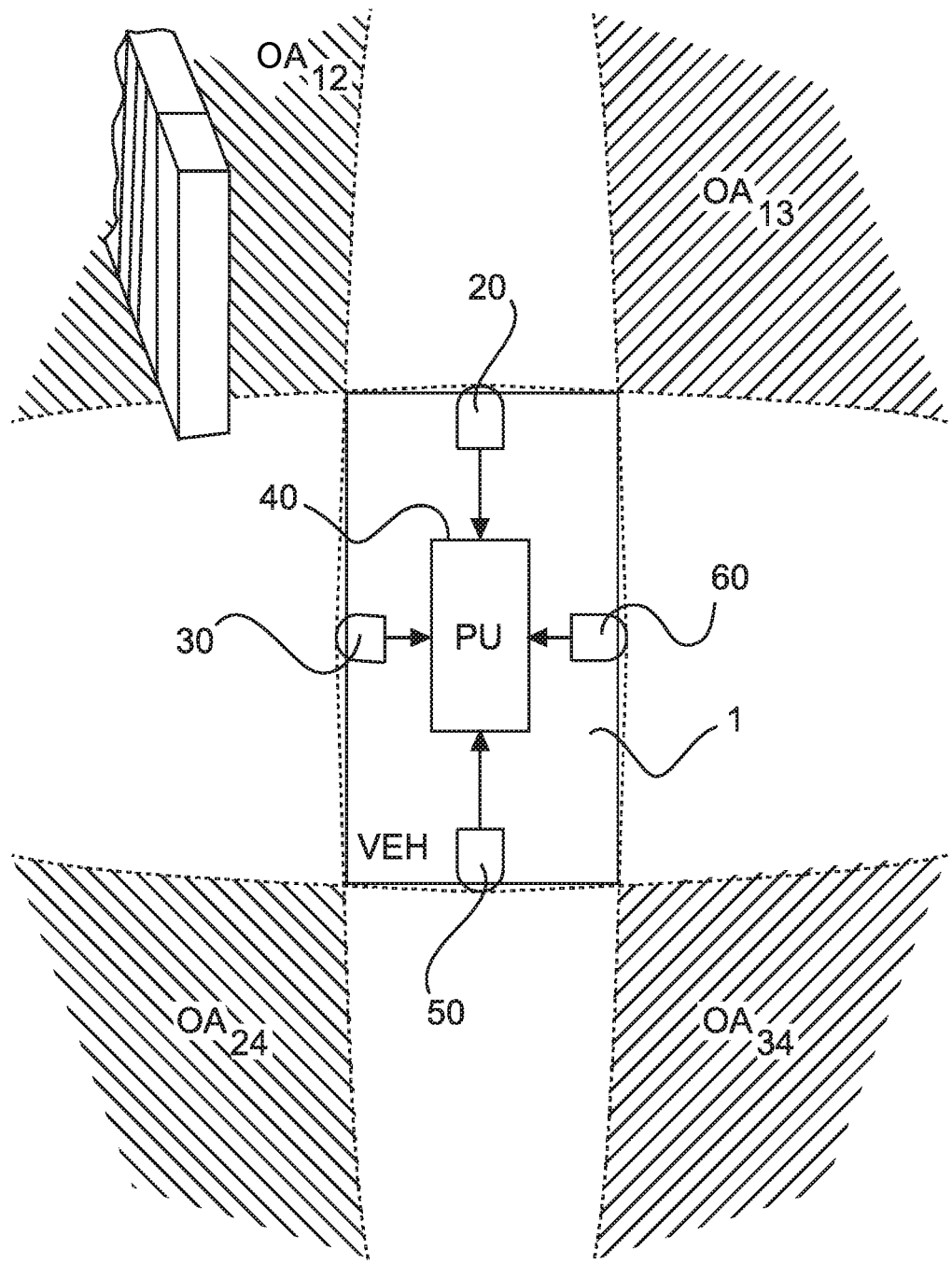
FIG. 7 shows a schematic configuration of an example of a system for providing improved obstacle identification.
Figure 1:
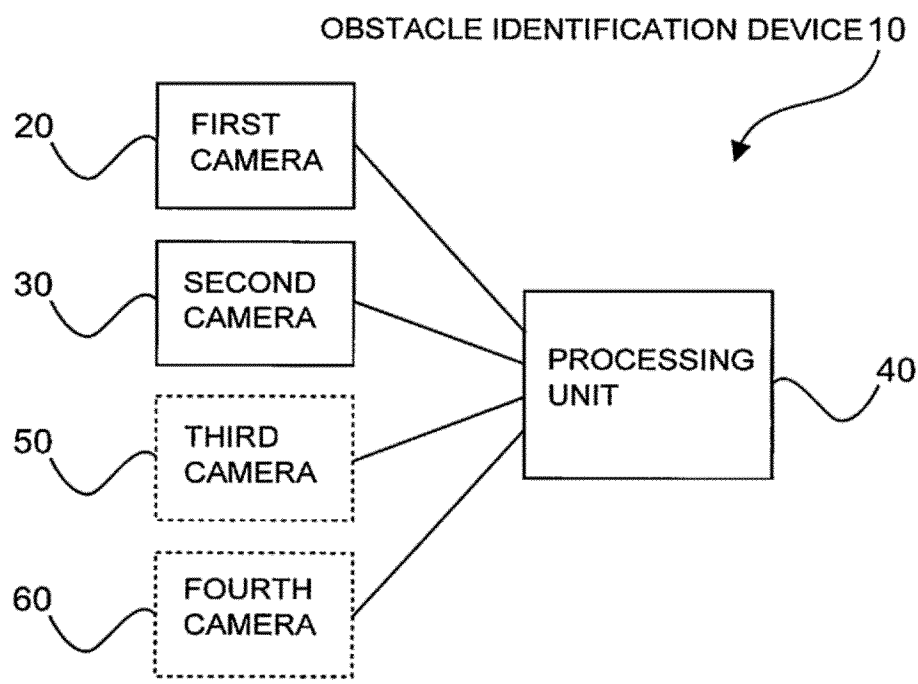
Figure 2:
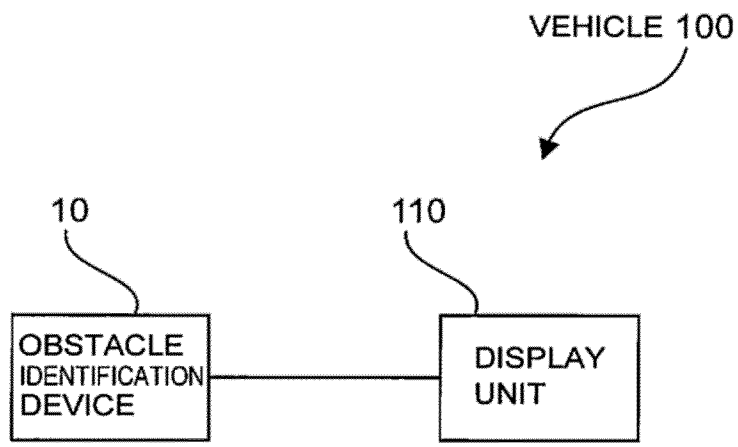

FIG. 7 shows in detail a vehicle with a detailed example of a surroundings imaging system 100, as described in FIG. 2 and FIG. 6. In the example shown, the vehicle VEH with the surroundings imaging system 100 includes four cameras 20, 30, 50, 60 positioned on different sides of the vehicle chassis. In the example depicted, each camera comprises a field of view FOV of more than 180 degrees. The depicted vehicle VEH may be any type of vehicle, such as an automobile, a bus or a truck, which performs a driving maneuver which may be assisted by a driver assistance system which has an integrated surroundings imaging system 100, as depicted in FIGS. 2 and 6. The four vehicle cameras 20, 30, 50, 60 are mounted on different sides of the vehicle chassis, such that four different overlap regions OAs are visible to the vehicle cameras, as shown in FIGS. 4 and 7. For example, in the front left-hand corner of the vehicle chassis is overlap region OA12 of the camera images CI, which is captured by the front camera 20 and the left-hand camera 30 of the surroundings imaging system 1 of the vehicle VEH. In FIG. 7 the overlap region OA12 comprises an obstacle. In the example depicted, the obstacle is a wall of a garage into which the driver of the vehicle VEH wishes to maneuver the vehicle VEH. The wall is within the overlap region and extends out of the overlap region. The processing unit, as described above, determines the image to be prioritized, from one of the cameras 20 or 30 for assembly of the image of the surroundings, on the basis of the number of features projected onto the ground plane which are located in the overlap region for each camera. This results in better imaging for objects which are within the overlap region and extend into the overlap region and the visibility of objects and obstacles is improved for the image of the surroundings.

In another exemplary embodiment, a computer program or a computer program element is provided which is characterized in that it is configured to execute the method steps of the method according to one of the preceding embodiments on a suitable system.

The computer program element may therefore be stored on a computer unit which could also be part of an embodiment. This computer unit may be configured to execute or prompt performance of the steps of the above-described method.

Furthermore, the computer unit may be configured to control the components of the above-described device and/or of the system. The computer unit may be configured to operate automatically and/or to execute a user's commands. A computer program may be loaded into a user memory of a data processor. The data processor may thus be designed to perform the method according to one of the preceding embodiments.

According to a further exemplary embodiment of the present invention, a computer-readable medium, such as for example a CD-ROM, is provided, wherein the computer-readable medium has a computer program element which is stored thereon. The computer program element was described in the preceding paragraph.

It should be noted that embodiments of the invention are described with reference to different subjects. In particular, some embodiments are described with reference to method claims, while other embodiments are described with reference to device claims. A person skilled in the art will however infer from the description above and below that, unless otherwise indicated, in addition to any desired combination of features of one subject matter, any desired combination of features of different subjects is also disclosed by this application. Combining all the features may, however, result in synergistic effects which are more than the simple sum of the associated features.

While the invention is depicted and described in detail in the drawings and the above description, such a depiction and description should be considered to be illustrative or exemplary and not limiting. The invention is not limited to the disclosed embodiments. When using a claimed invention, other variations of the disclosed embodiments may be understood and brought about by persons skilled in the art from a study of the drawings, the disclosure, and the dependent claims.

In the claims, the word "having" does not exclude other elements or steps, and the indefinite article "an" or "a" does not exclude a plurality. An individual processor or another unit may fulfill the functions of multiple points reproduced in the claims. The mere fact that certain measures are reproduced in different dependent claims does not mean that a combination of these measures cannot advantageously be used. All reference signs in the claims should not be interpreted as limiting the scope.

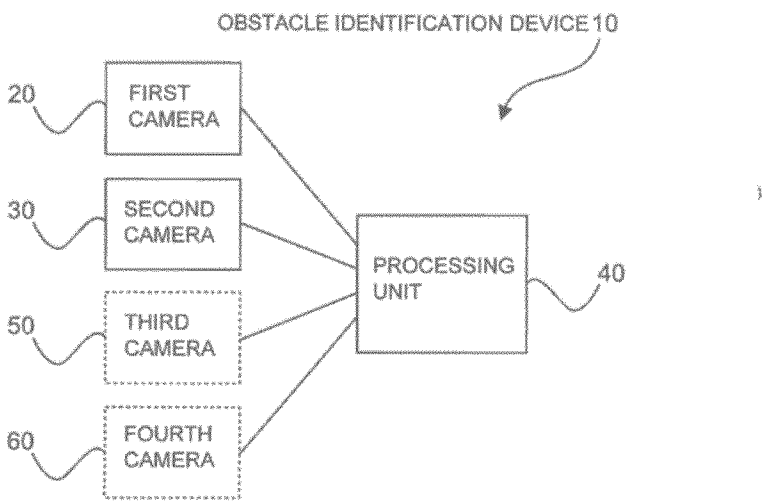

The invention claimed is:

1. A device for providing obstacle identification, comprising:
  a first camera;
  a second camera; and
  a processing unit;

wherein the first camera is configured to acquire first vehicle image data, and to provide the first vehicle image data to the processing unit;

wherein the second camera is configured to acquire second vehicle image data, and to provide the second vehicle image data to the processing unit;

wherein an image overlap region exists, which comprises at least a portion of the first vehicle image data and at least a portion of the second vehicle image data;

wherein the first vehicle image data and the second vehicle image data extend over a ground plane, wherein the image overlap region extends over a ground overlap region of the ground plane;

wherein the processing unit is configured to extract first image features from the first vehicle image data, and to extract second image features from the second vehicle image data;

wherein the processing unit is configured to project the first image features onto the ground plane, and to project the second image features onto the ground plane; and wherein the processing unit is configured to produce at least one image of surroundings, comprising either (a) at least a portion of the first vehicle image data associated with the ground overlap region, or (b) at least a portion of the second vehicle image data associated with the ground overlap region, wherein the first vehicle image data or the second vehicle image data are prioritized based on at least one characteristic of the respective first image features or second image features that have been projected onto the ground overlap region of the ground plane.

2. The device according to claim 1, wherein the processing unit is configured to determine the at least one characteristic of the first image features comprising a number of the first image features whose projections lie in the ground overlap region of the ground plane, and to determine the at least one characteristic of the second image features comprising a number of the second image features whose projections lie in the ground overlap region of the ground plane;

wherein the processing unit is configured to produce the at least one image of the surroundings that comprises at least the portion of the first vehicle image data associated with the ground overlap region when the number of the first image features whose projections lie in the ground overlap region is greater than the number of the second image features whose projections lie in the ground overlap region; and wherein the processing unit is configured to produce the at least one image of the surroundings that comprises at least the portion of the second vehicle image data associated with the ground overlap region when the number of the second image features whose projections lie in the ground overlap region is greater than the number of the first image features whose projections lie in the ground overlap region.

3. The device according to claim 1, wherein the extracting of the first image features comprises determination of binary data, and wherein the extracting of the second image features comprises determination of binary data.

4. The device according to claim 1, wherein the projecting of the first image features comprises projecting along vectors which extend from the first camera through the first image features to the ground plane, and wherein the projecting of the second image features comprises projecting along vectors which extend from the second camera through the second image features to the ground plane.

5. The device according to claim 1, wherein the at least one image of the surroundings comprises the first vehicle image data outside the ground overlap region and comprises the second vehicle image data outside the ground overlap region.

6. The device according to claim 1, wherein the producing of the at least one image of the surroundings is based in part on ones of the first image features that are physically located in the ground overlap region and on ones of the second image features that are physically located in the ground overlap region.

7. The device according to claim 6, wherein the processing unit is configured to determine the at least one characteristic of the first image features comprising a number of the first image features whose projections lie in the ground overlap region and comprising a number of the first image features having world coordinates in the ground overlap region, and the processing unit is configured to determine the at least one characteristic of the second image features comprising a number of the second image features whose projections lie in the ground overlap region and comprising a number of the second image features having world coordinates in the ground overlap region;

wherein the processing unit is configured to produce the at least one image of the surroundings comprising at least a portion of the first vehicle image data associated with the ground overlap region when a first sum of the number of the first image features whose projections lie in the ground overlap region added to the number of the first image features having world coordinates in the ground overlap region, is greater than a second sum of the number of the second image features whose projections lie in the ground overlap region added to the number of the second image features having world coordinates in the ground overlap region; and wherein the processing unit is configured to produce the at least one image of the surroundings comprising at least a portion of the second vehicle image data associated with the ground overlap region when the second sum, is greater than the first sum.

8. A vehicle configured to provide obstacle identification, comprising:

a device configured to provide obstacle identification according to claim 1; and a display unit configured to display the at least one image of the surroundings.

9. A method of obstacle identification, comprising steps:

a) acquiring first vehicle image data with a first camera;

b) providing the first vehicle image data to a processing unit by the first camera;

c) acquiring second vehicle image data with a second camera, wherein a region of image overlap exists which comprises at least a portion of the first vehicle image data and at least a portion of the second vehicle image data, wherein the first vehicle image data and the second vehicle image data extend over a ground plane, and wherein the region of the image overlap extends over a ground overlap region of the ground plane;

d) providing the second vehicle image data to the processing unit by the second camera;

e) extracting first image features from the first vehicle image data by the processing unit;

f) extracting second image features from the second vehicle image data by the processing unit;

g) projecting the first image features onto the ground plane by the processing unit;

h) projecting the second image features onto the ground plane by the processing unit; and i) producing, by the processing unit, at least one image of surroundings, comprising either a sub-step i-a) wherein the at least one image of surroundings comprises at least a portion of the first vehicle image data associated with the ground overlap region, or a sub-step i-b) wherein the at least one image of surroundings comprises at least a portion of the second vehicle image data associated with the ground overlap region, wherein the first vehicle image data or the second vehicle image data are prioritized based on at least one characteristic of the respective first image features or second image features that have been projected onto the ground overlap region of the ground plane.

10. The method according to claim 9, further comprising:

determining, by the processing unit, the at least one characteristic of the first image features comprising a number of the first image features whose projections lie in the ground overlap region of the ground plane; and determining, by the processing unit, the at least one characteristic of the second image features comprising a number of the second image features whose projections lie in the ground overlap region of the ground plane;

wherein the sub-step i-a) proceeds when the number of the first image features whose projections lie in the ground overlap region is greater than the number of the second image features whose projections lie in the ground overlap region; and wherein the sub-step i-b) proceeds when the number of the second image features whose projections lie in the ground overlap region is greater than the number of the first image features whose projections lie in the ground overlap region.

11. A computer program element stored on a non-transitory computer-readable medium and configured to perform the method according to claim 9 upon execution of the computer program element by a processor.

12. The method according to claim 9, further comprising displaying the at least one image of the surroundings on a display unit in a vehicle.

13. The method according to claim 9, wherein the image overlap region of a respective single image of the at least one image of the surroundings produced in the step i) consists of only either (i-a) the portion of the first vehicle image data associated with the ground overlap region, or (i-b) the portion of the second vehicle image data associated with the ground overlap region, based on the prioritizing.

14. The device according to claim 1, wherein the processing unit is configured to produce the at least one image of the surroundings so that the image overlap region of a respective single image of the at least one image of the surroundings consists of only either the portion of the first vehicle image data associated with the ground overlap region, or the portion of the second vehicle image data associated with the ground overlap region, based on the prioritizing.

* * * * *

UNITED STATES PATENT AND TRADEMARK OFFICE
CERTIFICATE OF CORRECTION

| | | |
|---|---|---|
| PATENT NO. | : 10,824,884 B2 | |
| APPLICATION NO. | : 16/468093 | |
| DATED | : November 3, 2020 | |
| INVENTOR(S) | : Sudhan Dhana Sekaran et al. | |

It is certified that error appears in the above-identified patent and that said Letters Patent is hereby corrected as shown below:

On the Title Page

Please replace the informal Drawing Figure 1 without labels with the Formal Drawing Figure 1 with labels as shown on the attached title page.

In the Drawings

Please replace the informal Drawing Sheet 1 without labels with the Formal Drawing Sheet 1 with labels as shown on the attached Drawing Sheet.

In the Claims

Column 12,
Claim 7, Line 45, before "greater than", replace "sum, is" with --sum is--.

Signed and Sealed this
Thirty-first Day of May, 2022

*Katherine Kelly Vidal*

Katherine Kelly Vidal
*Director of the United States Patent and Trademark Office*

(12) United States Patent
Dhana Sekaran et al.

(10) Patent No.: US 10,824,884 B2
(45) Date of Patent: Nov. 3, 2020

(54) DEVICE FOR PROVIDING IMPROVED OBSTACLE IDENTIFICATION

(71) Applicant: Conti Temic microelectronic GmbH, Nuremberg (DE)

(72) Inventors: Sudhan Dhana Sekaran, Bamberg (DE); Joerg Schrepfer, Tettau (DE); Johannes Petzold, Kulmbach (DE); Markus Friebe, Gefrees (DE); Georg Arbeiter, Kueps (DE); Peerayut Khongsab, Grebrunn (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 16/468,093

(22) PCT Filed: Dec. 6, 2017

(86) PCT No.: PCT/DE2017/200129
§ 371 (c)(1),
(2) Date: Jun. 10, 2019

(87) PCT Pub. No.: WO2018/108215
PCT Pub. Date: Jun. 21, 2018

(65) Prior Publication Data
US 2020/0074191 A1  Mar. 5, 2020

(30) Foreign Application Priority Data
Dec. 15, 2016  (DE) .................. 10 2016 225 073

(51) Int. Cl.
*G06K 9/00* (2006.01)
*B60R 1/00* (2006.01)

(52) U.S. Cl.
CPC ............ *G06K 9/00805* (2013.01); *B60R 1/00* (2013.01); *B60R 2300/105* (2013.01); *B60R 2300/301* (2013.01); *G06T 2207/30261* (2013.01)

(58) Field of Classification Search
CPC ............... G06K 9/00805; B60R 1/00; B60R 2300/105; B60R 2300/301; G06T 2207/30261
(Continued)

(56) References Cited
U.S. PATENT DOCUMENTS 8,154,594 B2 * 4/2012 Seki .................... B60R 1/00
  348/119
8,331,653 B2 * 12/2012 Seki .................... G06T 7/74
  382/103
(Continued)

FOREIGN PATENT DOCUMENTS

DE  102006003538  7/2007
DE  102012215026  5/2014
(Continued)

OTHER PUBLICATIONS

English translation of the International Search Report of the International Searching Authority for International Application PCT/DE2017/200129, dated Apr. 3, 2018, 2 pages, European Patent Office, HV Rijswijk, Netherlands.
(Continued)

Primary Examiner — Eric Blount
(74) Attorney, Agent, or Firm — W. F. Fasse

(57) ABSTRACT

A device provides improved obstacle identification. A first camera acquires first vehicle image data and provides it to a processing unit. A second camera acquires and provides second vehicle image data. An image overlap region has at least a portion of the first vehicle image data and at least a portion of the second vehicle image data. The first and
(Continued)